(12) United States Patent
Gerdemann et al.

(10) Patent No.: US 7,877,158 B2
(45) Date of Patent: Jan. 25, 2011

(54) METHOD FOR OPERATING INDUSTRIAL INSTALLATIONS

(75) Inventors: Ulrich Gerdemann, Langensendelbach (DE); Josef Meixner, Erlangen (DE); Reinhard Sauerwein, Gerhardshofen (DE)

(73) Assignee: Siemens Aktiengesellschaft, Munich (DE)

( * ) Notice: Subject to any disclaimer, the term of this patent is extended or adjusted under 35 U.S.C. 154(b) by 1049 days.

(21) Appl. No.: 10/579,486

(22) PCT Filed: Nov. 19, 2004

(86) PCT No.: PCT/US2004/039250

§ 371 (c)(1),
(2), (4) Date: Jan. 12, 2007

(87) PCT Pub. No.: WO2005/052840

PCT Pub. Date: Jun. 9, 2005

(65) Prior Publication Data

US 2007/0244596 A1    Oct. 18, 2007

Related U.S. Application Data

(60) Provisional application No. 60/524,227, filed on Nov. 21, 2003.

(30) Foreign Application Priority Data

Nov. 21, 2003    (DE) ................ 103 54 809

(51) Int. Cl.
*G06F 19/00* (2006.01)
(52) U.S. Cl. ........................ 700/115; 702/84
(58) Field of Classification Search ........... 700/115, 700/169, 166; 702/184; 361/679.4
See application file for complete search history.

(56) References Cited

U.S. PATENT DOCUMENTS

| 6,587,812 | B1 | 7/2003 | Takayama |
| 6,671,585 | B2 * | 12/2003 | Lof et al. ................ 705/36 R |
| 6,697,894 | B1 | 2/2004 | Mitchell et al. |
| 6,718,215 | B2 * | 4/2004 | Friedrich et al. ............ 700/65 |
| 6,801,821 | B2 | 10/2004 | Madden et al. |
| 7,565,221 | B2 * | 7/2009 | Fischer et al. ............. 700/200 |
| 2003/0123060 | A1 * | 7/2003 | Opsal et al. ............... 356/369 |

FOREIGN PATENT DOCUMENTS

RU    2053535 C1    1/1996

* cited by examiner

*Primary Examiner* — Kidest Bahta

(57) ABSTRACT

The method was tackled with picking line for generating strip steel for the automobile industry. The initial conditions to which the tandem-type mill coupled with picking line executed using the installation is exposed. The installation receives an input in the form of human resources, energy, media, raw materials, semifinished product, etc., which is converted by the installation into output. Since the plant is a hot rolling mill, the output is in the form of hot rolled strips. The different components of the input can be assigned to the factor markets that are relevant to the real installation. The different components of the output can further be assigned to the product markets that are relevant to the real installation.

19 Claims, 4 Drawing Sheets

FIG 3
FIG 3a
(PRIOR ART)
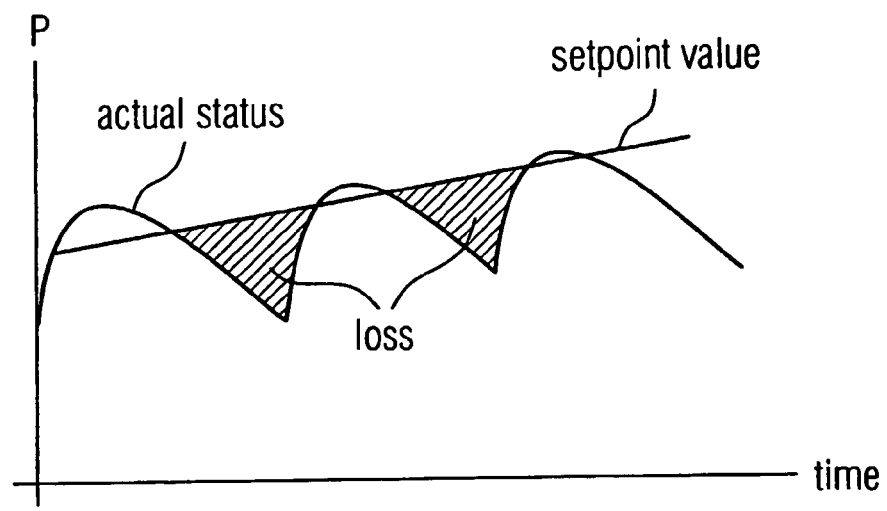
FIG 3b
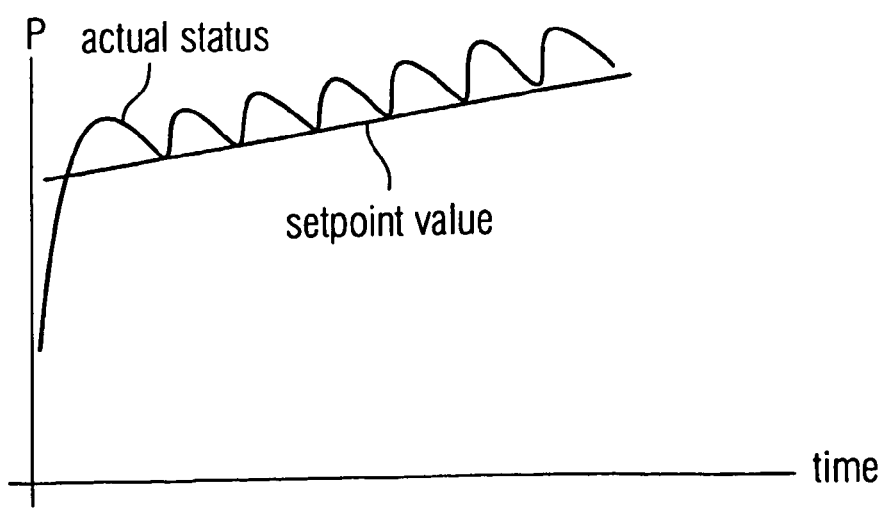

METHOD FOR OPERATING INDUSTRIAL INSTALLATIONS

CROSS REFERENCE TO RELATED APPLICATIONS

This application is the US National Stage of International Application No. PCT/US2004/039250, filed Nov. 19, 2004 and claims the benefit thereof. The International Application claims the benefits of German application No. 10354809.2 DE filed Nov. 21, 2003 and U.S. application No. 60/524,227 filed Nov. 21, 2003, all of the applications are incorporated by reference herein in their entirety.

FIELD OF THE INVENTION

The invention relates to a method for operating industrial installations and industrial processes, and in particular the operation of long-lived industrial production facilities. In this case the operation of the facilities relates in particular to the ongoing maintenance and properly targeted modernization of said facilities.

BACKGROUND OF THE INVENTION

Long-lived industrial installations, for example rolling mills, paper mills or glass manufacturing plants, are built for a specific purpose. At the same time the conditions prevailing in the sales, technology, method and factor markets relevant to the installation at the time of planning and erection are taken into account along with the associated risks, and also projected into the future.

In the course of the service life of an installation of said kind there are changes not only in these conditions but also with regard to the integration of the installation into a corporate context. Thus, for example, the products to be produced can be developed further as a result of customer requirements or technological development, and so also can the technology employed in the manufacture of said products. The existing technology is subject to wear and tear or to some other aging process. In the context of software or IT systems this is referred to as obsolescence. Due to these circumstances additional entrepreneurial risks arise over the course of the installation's life. These can manifest themselves for example in a decline in the quality of the products, in production downtimes, in competitors' gaining a lead, or also through missed business opportunities.

It is known that over the lifecycle of an installation there is carried out at specific time intervals routine maintenance, event-dependent active maintenance, or at longer time intervals a complete modernization of the installation. In some branches of industry, for example in the automobile industry, it has also proven to be economically feasible to discount the longevity of the installation and for example to build a new production facility in synchronism with each product innovation.

The disadvantage of routine maintenance and active maintenance is that with this, in the best case the original status, which is largely determined by the design, can be restored. An improvement or adaptation to new conditions, production factors, products, markets or corporate strategies does not take place.

Although complete modernization does not have this disadvantage, for its part it does have the disadvantage that a considerable production outage is always associated with it, and that a financially and technically complicated handling process with not inconsiderable additional risks has to be initiated.

Because of the high investment volume and the fiscal depreciation periods associated therewith, it is not possible to sacrifice longevity in the same way in all branches of industry.

SUMMARY OF THE INVENTION

The invention is based on the technical problem of providing a method for operation of technical installations by means of which structural improvement measures can either be deliberately avoided or else carried out on behalf of the operator in a particularly targeted and efficient manner in terms of an increase in value retention. At the same time the method is also to be realizable by means of a computer program and using a computer system.

A further technical problem is to set technical influencing variables of the installation reliably to their setpoint value on a long-term basis.

The solution to this technical problem is provided by the features recited in the independent claims. Advantageous developments are reproduced by the features recited in the dependent claims or can be derived from the description in conjunction with the figures.

The invention is based on the knowledge that the value retention of an installation can be increased by the reliable setting of technical influencing variables to their setpoint value on a long-term basis.

In the present description the value retention of an installation is to be understood as a variable which not only includes the replacement value or current market value of the installation, but also, and quite fundamentally, the economic usefulness of the installation as that capability to generate a profit with the installation at the present time and in the future at the installation site and under the prevailing economic and legal framework conditions. Owing the profit aspect mentioned, the value retention can also be interpreted as the return on fixed capital. The value retention can be expressed in terms of an EBIT (Earnings Before Interest and Taxes) and depends generally on many factors, also including, however, a large number of technical influencing variables. Which influencing variables or measurement variables are important for determining this economic usefulness in the real-world case, i.e. for a real installation or for a real process, depends on the type of the installation and its technological environment. In many cases said variables include the reject rate of the installation, its efficiency, its service lifecycles, its availability, times required for the conversion to a new or different product, its energy and water consumption, the time required for maintenance steps, and many other measurement variables. Experience shows that the technical impact on the economic usefulness of an installation can in many cases be captured by means of approx. 100 to 200 significant technical measurement variables.

If those technical measurement variables which co-determine, or at least substantially co-determine, the value retention of a real installation are successfully identified, then it is necessary, in a next step, to specify which measurement methods are to be used to determine the respective measurement variables. In most cases the measurement method for installations of the type to be investigated is known and established across the industry, and to that extent determining the measurement method is not a problem for the person skilled in the art.

The result at this intermediate stage of the method is that set of identified technical measurement variables which determine the economic usefulness of the installation to be investigated. In other words, this set of measurement variables represents the technically related economic condition of the installation.

If desired, the identified measurement variables can also be combined into a single variable. In this case it is recorded in a model-based procedure how the aforementioned measurement variables are technically related and how they impact the value retention. The model then yields a computing rule specifying how the aforementioned single variable can be calculated. In the absence of the detailed knowledge required in this case it is also possible to choose a heuristic approach and to weight the measurement variables according to the degree to which they influence the economic usefulness. The factors of this weighting can subsequently be combined to form a single variable. In a suitable normalization of the variable this can be for example a number between 1 and 6, and to that extent stands in the nature of a school mark for the technically related economic condition of the installation.

Following the identification of the relevant measurement variables and the associated measurement methods, the actual status of the real installation is recorded by measurement of the identified measurement variables using the specified measurement methods.

Once the actual status of the real installation to be investigated has been determined, a benchmark is specified. A benchmark, in this context, is a gauge for the assessment of the previously determined actual status of the installation to be investigated. In order to specify a benchmark, actual statuses are preferably recorded for such installations which are similar when compared with the installation to be assessed.

In most cases there are existing installations, for example from the same manufacturer or from a competing manufacturer, or even from the same operator or other operators, which are similar to the installation to be investigated. If this is the case, the actual statuses of such installations are recorded. For the assessment of the actual status of the similar installation, as a general principle the same set of measurement variables is chosen. However, for practical reasons it will often not be possible to measure all the measurement variables in the set of measurement variables on the similar installation, for example because no access to such an installation is granted. In this case there is a smaller number of measured values from the similar installation than is the case on the installation to be investigated. In this case the measurement variables of said similar installation can only be used to a limited extent for purposes of comparison, and the benchmark must be supported by further installations and sources. For example, new installations in the development or building phase which are similar to the installation to be investigated can be used for this purpose. In this case, too, an actual status can be determined in the manner described above. As a rule this will only be possible if the manufacturer of the new installation is the one that is personally practicing the method according to the invention.

Installation-specific key components and/or installation-relevant innovations can also be recorded for the purpose of specifying the benchmark. Thus, there are installations in which certain installation components are economically of special significance. An example of this would be a new method for replacing the roller offering significantly faster roller replacement for worn-out rollers in the printing machines sector. A further example would be a new means of regulating the thickness of a product (for example, a protective coating) by the use of new model-based methods based on previously unavailable real-time computing power. Also of particular economic significance would be the possibility, provided for the first time in the real application, to allow a conversion to a new product to proceed fully automatically for the first time. To sum up, key components and installation-relevant innovations of said kind influence the value of the installation to a not inconsiderable degree and are therefore systematically recorded on an industry-specific basis starting from existing installations and used for the benchmark in the manner of a checklist for the degree of expansion of the installation.

Similarly, technical innovations which influence the economic usefulness of the installation, and which are also incorporated into the benchmark, can become established in the market relevant to the installation to be investigated. Thus, for example, the economic value of production facilities for traditional, i.e. analog, video recorders or television sets is influenced by the alternative or additional possibilities which digitization brings. The same applies analogously in relation to production facilities for cameras, since digital cameras are becoming increasingly important. For the cases cited, digitization of the product sector is of considerable economic importance, and moreover in particular for such installations which exclusively produce non-digital products of these product types.

In order to devise a benchmark it is necessary to study the markets relevant to the installation as well as to record changes in these markets. The markets relevant to the installation are the factor markets and the product markets. Also of importance is, as explained in the foregoing, the technological environment of the installation for the purpose of registering installation-relevant innovations and key components.

In a subsequent step of the method according to the invention, the actual status of the real installation is compared with the specified benchmark for the purpose of determining at least one measurement variable whose change in value would increase the value retention of the installation. In this step the current status of the installation to be investigated is thus measured against the benchmark. By this means it is discovered which measurement variable can realistically be improved in its value, with the result being of a qualitative nature. If it is considered, for example, whether the reduction in the reject rate could have an impact on the value retention, then it is possible to establish via the benchmark first what reject rate similar installations have. If the reject rate from the similar installations is less, then it ought to be possible in many cases to reduce the reject rate of the installation to be investigated at reasonable cost. If the reject rate of the real installation is better than in the similar installations, then as a rule there is no need to take action with regard to this measurement variable, since experience has shown that a further improvement in a measurement variable that is in any case good to optimal is associated with a very high overhead. In summary, measuring the status of the installation against the benchmark enables the qualitative conclusion to be made about which measurement variable changes could increase the economic usefulness of the installation at reasonable cost.

Following the measurement of the installation status against the benchmark it is optionally possible not only to make a qualitative pronouncement of the aforementioned type, but also to quantify the increase in value retention in a real way and express it for example in the form of an EBIT. This is done by means of an economic costs/benefits calculation and is generally to the person skilled in the art.

Once the measurement variables whose change in value would increase the value retention of the installation have been identified, it is subsequently determined which structural measure or which structural measures need to be taken on the installation in order to change the measurement variable in a positive direction, i.e. to change it in such a way that the value retention of the installation is increased. In parallel it is ensured that the measure on this real installation, also when considered in detail, can be technically executed.

The achieved result of the method consists in an increase in the value retention of the installation resulting from the optimized setting of the technical influencing variables.

An advantage linked with the use of a benchmark is that existing technical weaknesses of the installation are laid bare on a basis that is objectivized to a greater extent and so do not rely on subjective assessments by the operating personnel of the installation operator. The weaknesses of the installations are therefore determined more reliably and more objectively.

A further advantage with the use of the benchmark is to be seen in the fact that it can be employed to discover which measurement variables can be improved with an economically justifiable outlay in terms of capital, labor, materials and energy. As a result of the comparison with similar installations it becomes clear whether the measured value associated with the respective measurement variable of the installation is comparatively good or comparatively poor. In this way the situation is avoided whereby the process of optimizing the installation is initiated at points where the technical and at the same time financial overhead is particularly high. In other words, with this approach it is more easily possible to achieve a maximum technical improvement of the installation with minimum effort and resources.

In a preferred embodiment the steps involving the capturing of the measurement variables through to the measurement of the installation status against the benchmark, that is to say the steps a) to d) according to the claims, are performed much more frequently (by a factor of 3 at least) than the following method steps. In this way the installation operator always has an up-to-date benchmark, knows at any given time the current installation status in relation to the status of similar installations, and does not run the risk that the installation to be investigated is being measured against an outdated yardstick. Many of the steps necessary for specifying a benchmark can also be carried out separately and largely independently of a status recording process at an installation. However, the aforementioned revision frequency is to be recommended to ensure the information is up-to-date.

A particularly labor-saving procedure is to have the recording of the actual status, and possibly also the comparison of the actual status with the benchmark, execute with software support. During the recording of the actual status the user will specify by means of a selection list the type of installation for which an actual status is to be determined. The program then prompts the user for the measured values relating to the measurement variables of the user's installation. This is possible because installations similar to each other are assessed using the same measurement variables, and the measurement variables relating to the similar installations are stored for the program. Optionally, the program can then also run a comparison of the actual status with the benchmark, assuming the latter is stored in the program. In this case it is also possible for the aforementioned software to be integrated into the installation and possibly linked with the software required for running the installation (e.g. the logic for a CNC machine). At the same time the recording of the measured values for the relevant measurement variables can thus be performed at least partially automatically and in near real-time. An updated benchmark can then be imported into the system at regular intervals by a service provider or the operator of the installation.

The recording of the actual status, possibly including comparison of the same with the benchmark, can also (like the overall method itself) be carried out by external service providers, and in this case is objectivized to an even greater extent than if it were carried out by personnel of the installation operator. Usually the process is then also completed particularly quickly and, because of the expert knowledge of the external professionals, also with increased methodical reliability.

It is also possible that the actual status is recorded with software support and the comparison with the benchmark performed by the aforementioned external service provider.

Following identification of technical measurement variables of the installation which lend themselves to improvement, the method according to the invention also includes the identification of structural measures relating to the installation, by means of which the value of at least one measurement variable will be changed while the value retention of the installation is increased. This method step requires average engineering knowledge and in the present context needs no further explanation.

Following identification of the structural measures it is possible to determine quantitatively by how much the economic usefulness of the installation will increase. At the same time the outlay, in financial and technical terms, associated with the structural measures can also be compared with the costs of a complete modernization of the installation. If the method according to the invention is performed by a service provider, it can be contractually agreed with said provider that the service provider will share not only the risk associated with the conversion, but also the risk of a possible non-achievement of the anticipated value retention.

A further advantage of the method according to the invention is obtained if the structural measures are carried out at a time when the actual status of the production facility is at least as good as its setpoint status. An attempt to explain this in more detail is shown in FIGS. 3a and 3b. In these, the variable "P" is plotted against time. The continuous straight line shows the setpoint progression of this variable, and the swung curve the actual status.

The variable "P" stands for the abstract performance of the installation, which performance is usually synonymous with the return on the capital tied to the installation. The setpoint curve indicates which technically related possibility of return on capital invested in the installation is applicable at a given time. This value is usually positive, as otherwise operation of the installation would be uneconomic. The continuous progression of the setpoint curve is represented in idealized form. Usually the setpoint value is also dependent on non-technical variables, but these are not relevant in the context of the present description. Thus, if the actual curve lies below the setpoint curve, the technical possibilities are not being exploited and the result is an unnecessary relative loss which in the worst case can lead to the installation making an absolute loss. By means of the present invention it is ensured by timely reaction that the period of relative loss is as short as possible and the deviation of the actual curve from the setpoint curve is as small as possible. At the same time it is ensured that the setpoint value itself is adjusted numerically on the basis of changed initial technical conditions.

However, since the measurement variables are set in such a way that the value retention of the installation is increased, "P" also stands for every measurement variable which, in terms of the foregoing explanations, has an influence on the economic usefulness of the installation. In other words, an actual curve progression under the setpoint curve is one in which the measurement variable (e.g. the time required for maintenance purposes each week) is worse than the setpoint.

If the structural measure is now carried out in a timely manner as proposed, phases are avoided in which the measurement variable falls below its setpoint value. This result is shown in FIG. 3b. In this way it is therefore possible to set measurement variables of the installation to their setpoint value reliably and on a long-term basis.

The aforementioned method can be implemented at least in parts by means of a computer system. This system firstly comprises means for identifying those technical measurement variables which co-determine the value retention of a real installation. These means can be a microprocessor which resorts to data in a working memory and/or on hard disk storage in order to carry out the identification. The system also possesses means for inputting measured values relating to the identified measurement variables, for example a keyboard, or a serial or parallel interface, or a USB port. The system further possesses means for comparing the actual status of the installation being studied with a benchmark stored in the system for the purpose of determining at least one measurement variable whose change in value would increase the value retention of the installation. The comparison means also can be a microprocessor in combination with a working memory and/or hard disk storage medium.

Optionally the system further has means which enable structural measures to improve the installation to be identified, by means of which measures the value of at least one measurement variable will be changed while the value retention of the installation is increased, and possibly also evaluation means, e.g. a floating point unit of a microprocessor, through the use of which it can be quantitatively determined by how much the value retention of the installation will increase as a result of the structural measure.

The method according to the invention can be implemented at least in parts by means of a computer program. This program executes the following steps:

a) it identifies those technical measurement variables which co-determine the value retention of a real installation, b) it prompts the user for measured values relating to the identified measurement variables, which values the user enters for example via a keyboard, c) it compares the actual status of the installation with a benchmark stored for the program, and determines at least one measurement variable whose change in value would increase the value retention of the installation.

If desired, the program identifies such structural measures to improve the installation by which the value of the at least one measurement variable will be changed while the value retention of the installation will be increased, and establishes quantitatively by how much (e.g. in EUR or another currency) the value retention of the installation will increase as a result of the structural measure.

The program can be stored on a data medium such as a CD or a DVD, in a computer memory, or be transferred by means of an electrical carrier signal from computer to computer. The last-mentioned option can be used for example in a network such as a LAN, WLAN or via the Internet.

BRIEF DESCRIPTION OF THE DRAWINGS

The invention will be explained in more detail below with reference to an exemplary embodiment in conjunction with the figures, in which:

FIG. 3 shows which result is achieved compared with the prior art,

Annex 1: Measurement variables of the exemplary embodiment.

DETAILED DESCRIPTION OF THE INVENTION

The practical implementation of the method was tackled on an installation in the shape of a tandem-type mill coupled with pickling line for generating strip steel for the automobile industry.

Figure 1:
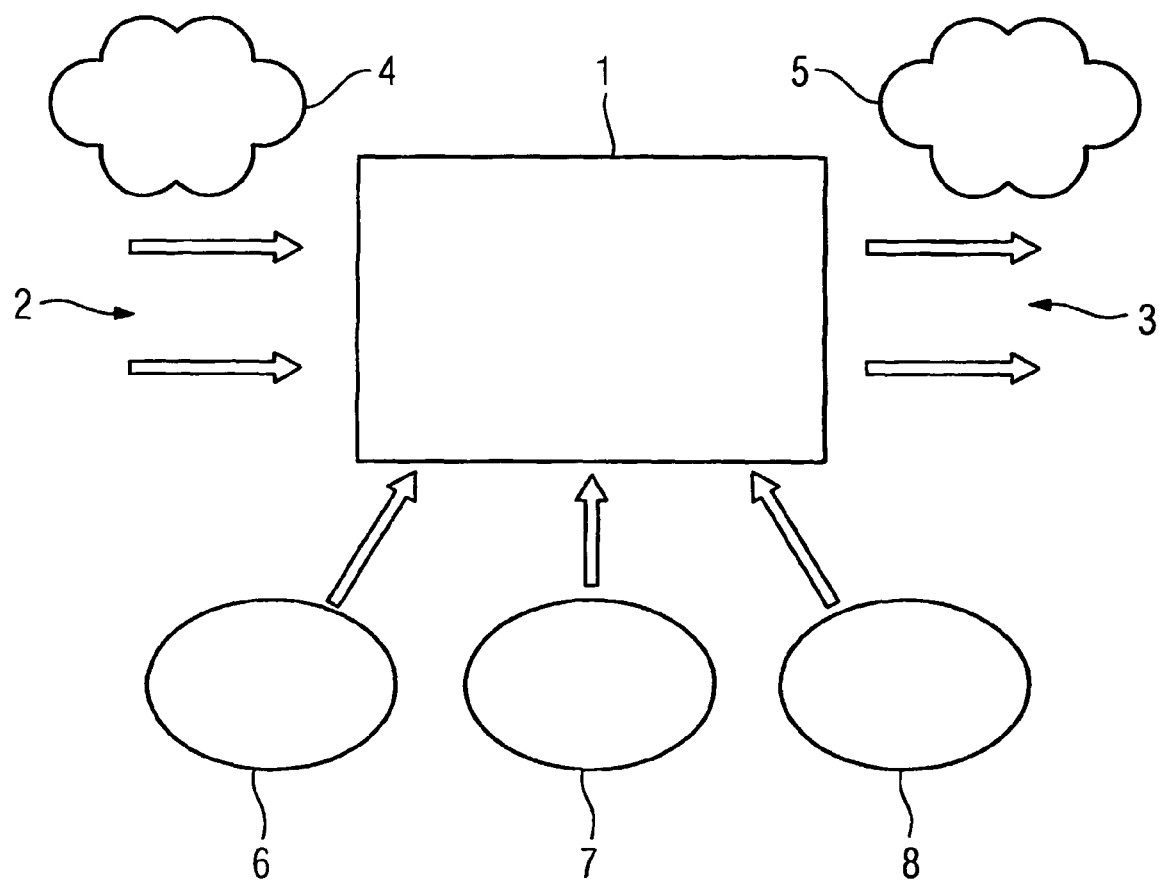
FIG. 1 shows the initial conditions to which a hot rolling mill is subject.

FIG. 1 shows the initial conditions to which the tandem-type mill coupled with pickling line 1 or a method 1' executed using the installation 1 is exposed. The installation 1 receives an input 2 in the form of human resources, energy, media, raw materials, semifinished product, etc., which is converted by the installation 1 into an output 3. Since the plant is a hot rolling mill, the output 3 is in the form of hot-rolled strips. The different components of the input 2 can be assigned to the factor markets 4 that are relevant to the real installation. The different components of the output 3 can further be assigned to the product markets 5 that are relevant to the real installation 1.

In addition to the methods executed by the installation 1 there are available on the market, for example from competitors, competing methods which in their totality form the methods market 6. Relative to the device 1 there are, in competition with it, technically similar systems in the equipment market 7, as well as, at the component level, key components 8 that are relevant to the installation.

Figure 2:
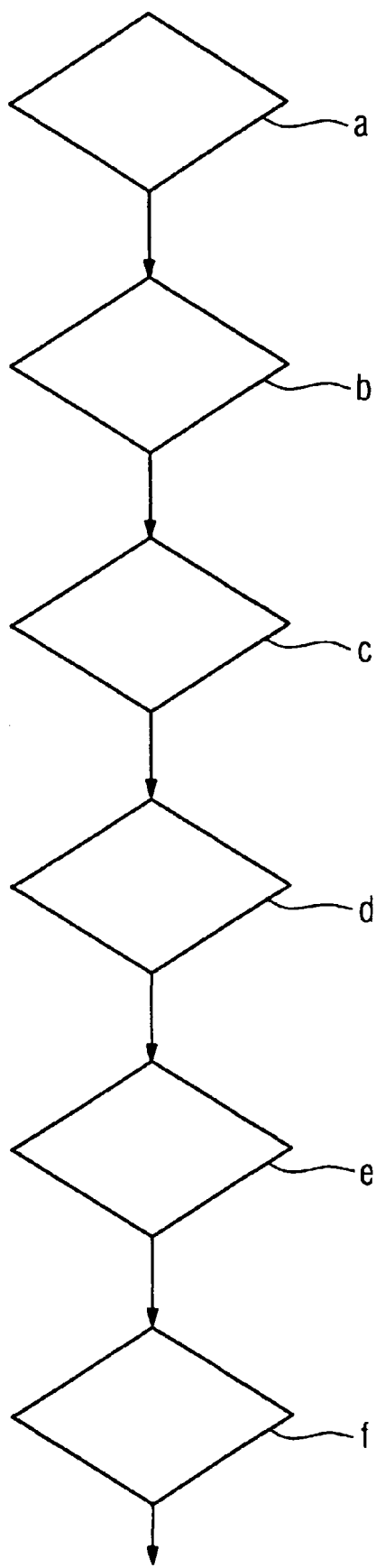
FIG. 2 shows, in the form of a flowchart, how the method is performed.

FIG. 2 shows, in the form of a flowchart, the steps that were applied in the method according to the invention. The letters a) to f) attached to the symbols correspond in this respect to the method steps a) to f) of the claims.

The measurement variables cited in Annex 1 were identified in step a). Since one measurement variable is OEE, the total number of measurement variables overall is very small, and in particular is less than the number of 100 to 200 referred to in the description. These variables were measured in step b).

At present a benchmark is being devised for the method from different sources according to step c), which benchmark, upon completion, will permit steps d), e) and to be performed. The model calculations according to FIG. 3a and FIG. 3B already explained above shows what results are ultimately to be expected when the method is performed.

Figure 4:
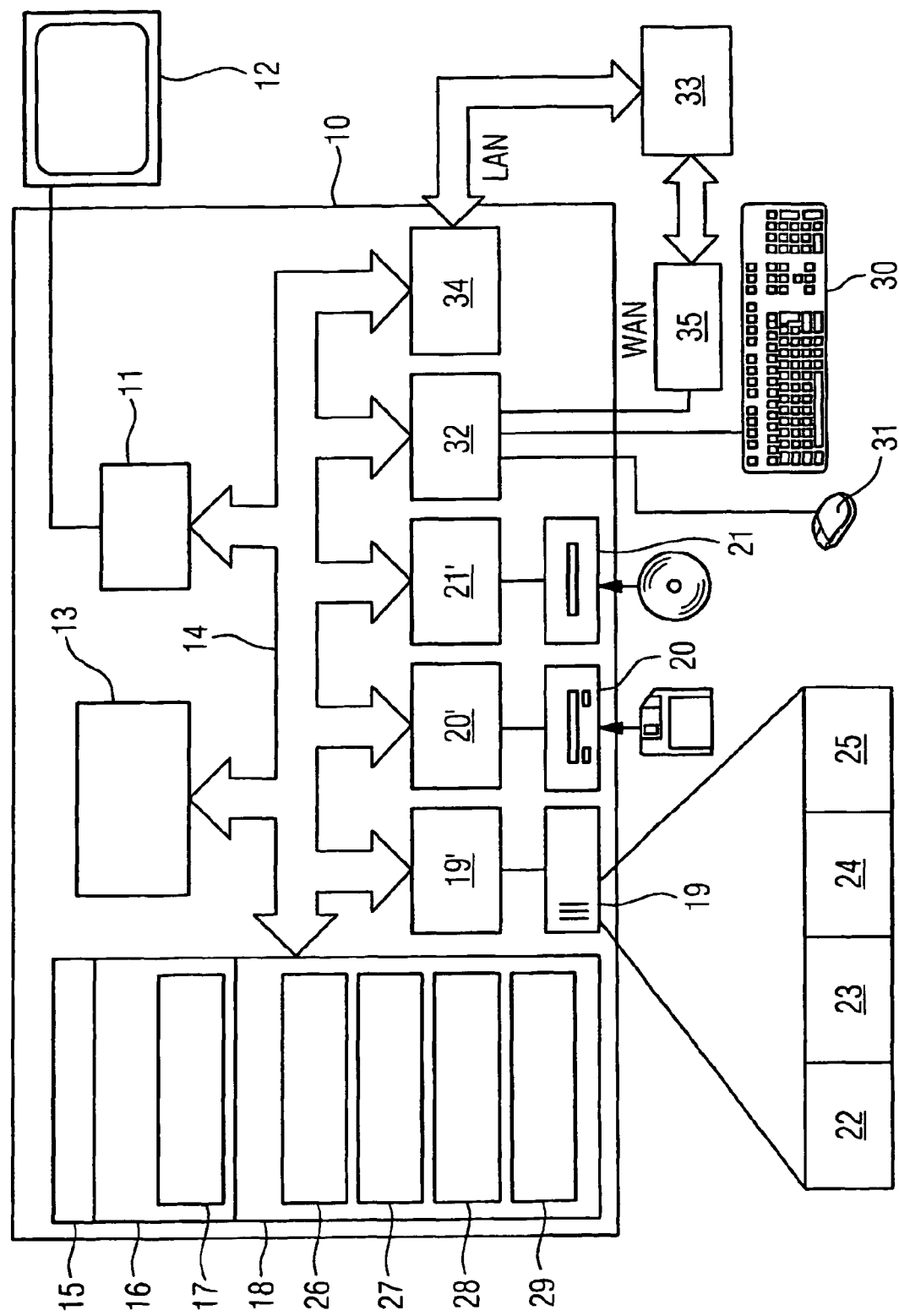
FIG. 4 shows a computer system for implementing the invention

FIG. 4 shows a computer system according to the invention, comprising a computer 10 whose outputs are displayed on a monitor 12 via a graphics card 11. The computer 10 has a central microprocessor 13 which is linked to the system memory 15 via the system bus 14. The system memory 15 comprises the ROM (Read Only Memory) 16, the BIOS (Basic Input/Output System) 17, and the working memory in the form of a RAM (Random Access Memory) 18. The computer 10 further has a hard disk 19, a floppy disk drive 20, a DVD drive 21. The hard disk 19, the floppy disk drive 20 and the DVD drive 21 are connected to the system bus 14 via respective interfaces 19', 20' and 21'.

The operating system 22, the computer program 23 according to the invention, data 24, and the benchmark 25 are stored on the hard disk 19. When the program 23 is invoked, it is loaded into the working memory 18, where it has a first module 26 for identifying those technical measurement variables which co-determine the value retention of a real installation, a second module 27 for interrogating measured values relating to the identified measurement variables, and a third module 28 for comparing the actual status of the installation with a benchmark 25 in order to determine at least one measurement variable whose change in value would increase the value retention of the installation. Further program modules 29 can also be stored in the RAM, for example a module for identifying structural measures or an evaluation module for calculating by how much (in EUR or another currency) the value retention of an installation can be increased quantitatively by structural modification measures.

During execution of the program 23, measured values are interrogated by the system 10. Said values can be typed in by the user via a keyboard 30 with support from a computer mouse 31, whereby the data reaches the working memory 15 via the serial interface 32 and the system bus 14.

As alternative to this, the data can be supplied by a server 33. If the computer 10 is part of a LAN, the data reaches the system bus 14 via a network card 34. If the computer 10 is part of a WAN, the data is transferred via a modem or router 35, and via the serial interface 32 to the system bus 14.

Annex 1: Measurement Variables a) the OEE (Overall Equipment Efficiency). In this case the OEE includes losses due to inadequate quality of the manufactured products (as a percentage of the number of products manufactured), includes the planned or unplanned downtime of the installation (as a percentage of the weekly working time), includes losses due to reduce speed of the installation (as a percentage of what it would otherwise be possible to manufacture at maximum speed), and includes other losses b) the consumption of hot rolled strip c) the consumption of pickling agents d) the consumption of electricity and other energy e) the consumption of rollers f) the number of man-hours required per ton of steel manufactured g) the number of man-hours required for maintenance purposes by the installation operator's own employees h) the number of man-hours required for maintenance and repairs by external personnel i) the specific spare parts turnover j) the status of the installed equipment (determined via an evaluation matrix)

k) the maintenance overhead required to keep the installation in operation l) the information technology configuration level

The invention claimed is:

1. A method for operating an industrial installation, comprising:
   using a computer system including a computer with a system memory and a plurality of modules;
   identifying a plurality of technical measurement variables which co-determine a value retention of a real installation by a first module of the computer;
   recording an actual status of the real installation by measuring the identified technical measurement variables, the actual status of the identified technical measurement variables being input into the computer via an inputting device;
   specifying a benchmark and storing the specified benchmark in the computer; comparing the actual status of the real installation with the specified benchmark to determine a technical measurement variable whose change in value increases the value retention of the real installation by a second module of the computer;
   identifying a plurality of structural measures which increase the value retention of the real installation by changing the value of the technical measurement variable by a third module of the computer; and
   carrying out the structural measures.

2. The method as claimed in claim 1, wherein the benchmark is specified by recording an actual status on an installation which is similar compared to the real installation to be assessed.

3. The method as claimed in claim 2, wherein the similar installation is an existing installation or an installation which is in a building phase.

4. The method as claimed in claim 2, wherein an installation-specific key component is recorded for specifying the benchmark.

5. The method as claimed in claim 2, wherein an installation-relevant innovation is recorded for specifying the benchmark.

6. The method as claimed in claim 1, wherein the actual status and a significant technical trend are recorded for factor markets relevant to the real installation, a product markets relevant to the real installation, and a technological environment of the real installation for specifying the benchmark.

7. The method as claimed in claim 1, wherein the method is partially carried out by an external service provider.

8. The method as claimed in claim 1, wherein the actual status of the real installation is partially determined by a software.

9. The method as claimed in claim 1, wherein steps of identifying the technical measurement variables, recording an actual status of the real installation, specifying a benchmark, and comparing the actual status of the real installation with the specified benchmark are carried out more frequently than steps of identifying the structural measures and carrying out the structural measures.

10. The method as claimed in claim 1, wherein an increase of the value retention of the real installation is quantitatively determined.

11. The method as claimed in claim 1, wherein the structural measures are carried out when the actual status of the real installation is at least as good as a setpoint status.

12. The method as claimed in claim 1, wherein the method is for operating a production facility.

13. A system for operating an industrial installation, comprising:
   an identifier for identifying a plurality of technical measurement variables which co-determine a value retention of a real installation;
   a recorder for recording an actual status of the real installation by measuring the identified technical measurement variables;
   an inputting device for inputting a plurality of measured values relating to the identified technical measurement variables; and
   a comparing device for comparing the actual status of the installation with a benchmark for determining a technical measurement variable whose change in value increases the value retention of the real installation.

14. The system as claimed in claim 13, wherein a plurality of structural measures are identified which increase the value retention of the real installation by changing the value of the determined technical measurement variable.

15. The system as claimed in claim 14, wherein an evaluation is provided by which an increase of the value retention of the real installation is quantitatively determined.

16. A non-transitory computer readable storage medium storing a computer program which executed by a computer system, performs a method for an industrial installation, the computer program
   a computer sub program for recording an actual status of the real installation by measuring the identified technical measurement variables;
   a computer sub program for interrogating a plurality of measured values relating to the identified technical measurement variables; and
   a computer sub program for comparing the actual status of the real installation with a benchmark for determining a technical measurement variable whose change in value increases the value retention of the real installation.

17. The computer program as claimed in claim 16, wherein a plurality of structural measures are identified which increase the value retention of the real installation by changing the value of the determined technical measurement variable.

18. The computer program as claimed in claim 16, wherein an increase of the value retention of the real installation is quantitatively determined.

19. The computer program as claimed in claim 16, wherein the method is for operating a production facility.

* * * * *